(12) United States Patent
Gerard

(10) Patent No.: US 8,458,949 B2
(45) Date of Patent: Jun. 11, 2013

(54) FAKE FISHING BAIT DEVICE, AND METHODS OF CONSTRUCTING AND UTILIZING SAME

(76) Inventor: George Gerard, Oscoda, MI (US)

( * ) Notice: Subject to any disclaimer, the term of this patent is extended or adjusted under 35 U.S.C. 154(b) by 781 days.

(21) Appl. No.: 12/556,120

(22) Filed: Sep. 9, 2009

(65) Prior Publication Data

US 2010/0071253 A1    Mar. 25, 2010

Related U.S. Application Data

(60) Provisional application No. 61/099,187, filed on Sep. 22, 2008.

(51) Int. Cl.
  *A01K 85/00* (2006.01)
(52) U.S. Cl.
  USPC .......................... 43/42.29; 43/42.36
(58) Field of Classification Search
  USPC .................. 43/42.06, 42.24, 42.29, 42.36
  See application file for complete search history.

(56) References Cited

U.S. PATENT DOCUMENTS

| | | | | |
|---|---|---|---|---|
| 1,272,183 A * | 7/1918 | Arnold | ........................ | 43/42.29 |
| 1,790,456 A * | 1/1931 | Bennington | ................. | 43/42.14 |
| 2,089,605 A * | 8/1937 | Hardy | .......................... | 43/42.26 |
| 2,423,717 A * | 7/1947 | Mikina | ........................ | 43/42.06 |
| 2,563,825 A * | 8/1951 | Ebert | ............................ | 43/42.24 |
| 2,791,056 A * | 5/1957 | Davis | ................................ | 43/41 |
| 3,040,467 A * | 6/1962 | Norton | ........................ | 43/42.29 |
| 3,579,895 A * | 5/1971 | Orn et al. | ....................... | 43/17.6 |
| 3,724,117 A * | 4/1973 | Flanagan, Jr. | ................ | 43/42.24 |
| 3,772,746 A * | 11/1973 | Ivanowicz | ....................... | 28/110 |
| 3,879,883 A | 4/1975 | Strader | | |
| 4,236,342 A * | 12/1980 | Saia | ............................... | 43/17.6 |
| 4,736,542 A * | 4/1988 | Floyd | ........................... | 43/42.06 |
| 4,869,014 A * | 9/1989 | Francklyn | ..................... | 43/44.6 |
| 5,065,541 A * | 11/1991 | Coody | ......................... | 43/42.29 |
| 5,113,608 A * | 5/1992 | Hook | ........................... | 43/42.49 |
| 5,276,993 A * | 1/1994 | Rosenblatt | ................... | 43/42.06 |
| 5,333,405 A | 8/1994 | Bowles | | |
| 5,465,523 A | 11/1995 | Garst | | |
| D381,733 S | 7/1997 | Shaw, III | | |
| 5,862,623 A * | 1/1999 | MacPherson | ................ | 43/42.24 |
| D560,747 S | 1/2008 | Shelton et al. | | |
| 7,774,975 B2 * | 8/2010 | Simmons et al. | ............ | 43/42.28 |

\* cited by examiner

*Primary Examiner* — Christopher P Ellis
(74) *Attorney, Agent, or Firm* — Weiner & Burt, P.C.; Irving M. Weiner; Pamela S. Burt

(57) ABSTRACT

A re-usable fake fishing bait device which glows or glitters, is stronger and more resilient than real bait, which eliminates the excessive preparation, care and costs of real bait, and to which any desired scent or oil may be applied.

3 Claims, 1 Drawing Sheet

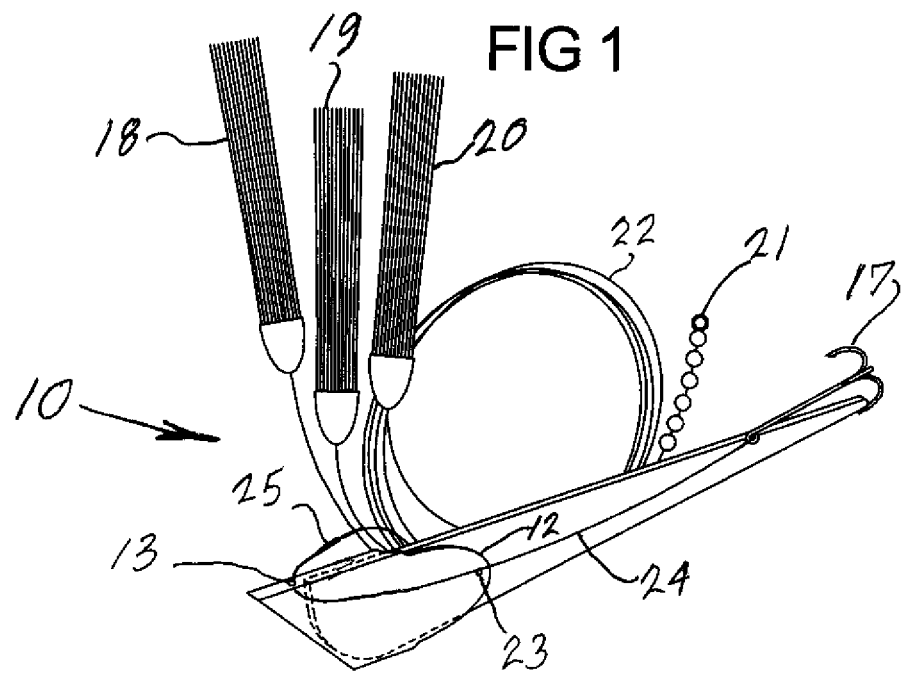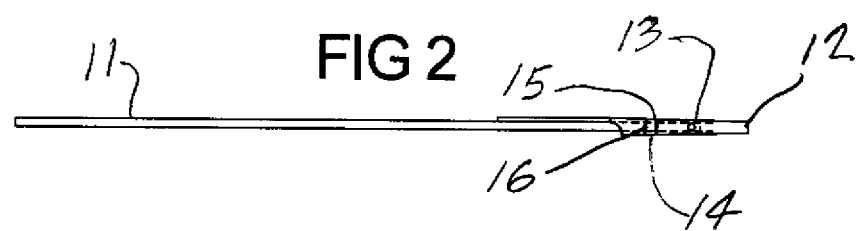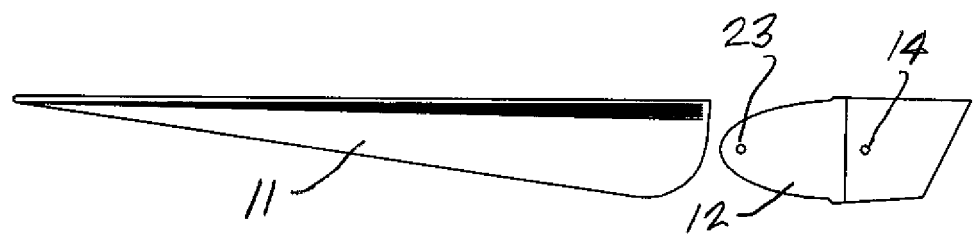

FAKE FISHING BAIT DEVICE, AND METHODS OF CONSTRUCTING AND UTILIZING SAME

CROSS-REFERENCE TO RELATED APPLICATIONS

This application claims priority from U.S. Provisional Patent Application 61/099,187 filed Sep. 22, 2008.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates to novel and unique fake fishing bait device, and methods of constructing and utilizing same.

More particularly, the present invention relates to re-usable fake fishing bait device which requires no refrigeration.

The prior, but not necessarily relevant, art is exemplified by:
Shaw III U.S. Design Pat. No. 381,733;
Shelton et al. U.S. Design Pat. No. 560,747;
Strader U.S. Pat. No. 3,879,883;
Bowles U.S. Pat. No. 5,333,405; and
Garst U.S. Pat. No. 5,465,523.

It is a desideratum of the present invention to avoid the animadversions of conventional and present devices, and at the same time to provide a very convenient and easy to use fake fishing bait.

SUMMARY OF THE INVENTION

The present invention provides a re-usable fake fishing bait device which requires no refrigeration or cooling, comprising: a fake bait strip member which is singed on at least one side thereof, and means for pinning said singed fake bait strip member to a bait head member.

The present invention also provides a re-usable fake fishing bait device which requires no refrigeration or cooling as described above, in combination with: a bait head member having a top aperture, a pair of coaxial side apertures, and a rear aperture; a shaft member passing through a first aperture of said pair of coaxial side apertures, said fake bait strip member, and a second aperture of said pair of coaxial side apertures to hold said fake bait strip member in said bait head member; a fishing hook; a fishing line; a first portion of said fishing line passes through said top aperture of said bait head member and then through said rear aperture of said bait head member and then to said fishing hook; said fishing line also passes through said top aperture of said bait head member to a second portion of said fishing line which is provided with at least one teaser head fly and a bead chain swivel; and said fake bait strip member is fabricated from polyester felt.

It is a primary object of the present invention to provide a re-usable fake fishing bait device.

Another object of the present invention to provide a re-usable fake fishing bait device which is stronger and more resilient than real bait.

A further object of the present invention to provide a re-usable fake fishing bait device which is stronger and more resilient than real bait, and which eliminates the excessive preparation, care and costs of real bait.

Yet another object of the present invention to provide a re-usable fake fishing bait device which is stronger and more resilient than real bait, and which eliminates the excessive preparation, care and costs of real bait, and to which any desired scent or oil may be applied.

Yet another object of the present invention to provide a re-usable fake fishing bait device which is glows or glitters, and is stronger and more resilient than real bait, and which eliminates the excessive preparation, care and costs of real bait, and to which any desired scent or oil may be applied.

Other objects, advantages, and features of the present invention will become apparent to those persons skilled in this particular area of technology and to other persons after having been exposed to the present patent application when read in conjunction with the accompanying patent drawings.

BRIEF DESCRIPTION OF THE DRAWINGS

FIG. 1 is a perspective view of a first embodiment of the present invention.

FIG. 2 is a top plan view of the bait head and bait strip members of the apparatus depicted in FIG. 1.

FIG. 3 is a side view of the bait strip.

FIG. 4 is a side view of the bait head member.

DETAILED DESCRIPTION OF THE INVENTION

With reference to the drawings, there is shown a fake fishing bait device 10 in accordance with a first embodiment of the invention.

The device 10 includes a fake bait strip member 11 which attaches to a bait head member 12.

Member 12 is provided with a top aperture 13, a pair of coaxial side apertures 14 and 15, and a rear aperture 23.

A shaft or pin 16 passes through and is secured to aperture 14, strip 11, and aperture 15 to hold strip 11 in head member 12.

A first portion 24 of a fishing line 22 passes through top aperture 13 and then through rear aperture 23, and then to a hook 17

The fishing line 22 also passes through top aperture 13 to a second portion 25 of the fishing line 22 which is preferably provided with teaser head flys 18, 19 and 20 and a bead chain swivel 21.

Preferably, but not necessarily, fake bait strip members 11 may be fabricated from polyester felt, 200 microns thick, singed on one side. The felt is cut into strips 11 which may be painted and glittered in a wide variety of colors to simulate a piece of cut bait.

Furthermore, the fake bait strip 11 may be soaked in herring oil or any suitable scent.

The fake bait strip 11 avoids the excessive preparation, care, and costs required in using actual herring strips.

In use, the fake bait strip 11 is pinned into the bait head 12, glowed up, dipped into a jar of herring or other scent oil, and lowered into the water. After several hours of fishing and trolling with the fake bait strip 11, the herring or other applied scent is still trapped in the bait head 12.

There has been illustrated in the accompanying drawings and described hereinabove only one possible unique and novel embodiment of the present invention which can be practiced and constructed in many different configurations, materials, arrangements of components, sizes, and shapes.

It should be understood that many changes, modifications, variations, and other uses and applications will become apparent to those persons skilled in this particular area of technology and to others after having been exposed to the present patent specification and accompanying drawings.

Any and all such changes, modifications, variations and other uses and applications which do not depart from the spirit and scope of the present invention are therefore covered by and embraced within the present invention and the patent claims set forth hereinbelow.

The invention claimed is:

1. A re-usable fake fishing bait device which requires no refrigeration or cooling, comprising:
   a fake bait strip member which is singed on at least one side thereof;
   said fake bait strip member is glittered in a variety of colors to simulate a piece of real cut bait;
   said fake bait strip member is painted in a variety of colors to simulate a piece of real cut bait;
   said fake bait strip member is soaked in herring oil;
   said fake bait strip member is soaked in any suitable scent; and
   means for pinning said singed fake bait strip member to a bait head member.

2. A re-usable fake fishing bait device which requires no refrigeration or cooling, comprising, in combination:
   a fake bait strip member which is singed on at least one side thereof;
   said fake bait strip member is fabricated from polyester felt;
   said fake bait strip member is glittered in a variety of colors to simulate a piece of real cut bait;
   said fake bait strip member is painted in a variety of colors to simulate a piece of real cut bait;
   said fake bait strip member is soaked in herring oil;
   said fake bait strip member is soaked in any suitable scent;
   a bait head member having a top aperture, a pair of coaxial side apertures, and a rear aperture;
   a shaft member passing through a first aperture of said pair of coaxial side apertures, said fake bait strip member, and a second aperture of said pair of coaxial side apertures to hold said fake bait strip member in said bait head member;
   a fishing hook;
   a fishing line;
   a first portion of said fishing line passes through said top aperture of said bait head member and then through said rear aperture of said bait head member and then to said fishing hook; and
   said fishing line also passes through said top aperture of said bait head member to a second portion of said fishing line which is provided with at least one teaser head fly and a bead chain swivel.

3. A re-usable fake fishing bait device which requires no refrigeration or cooling, comprising, in combination:
   a fake bait strip member fabricated from polyester felt;
   said fake bait strip member is glittered in a variety of colors to simulate a piece of real cut bait;
   said fake bait strip member is painted in a variety of colors to simulate a piece of real cut bait;
   said fake bait strip member is soaked in herring oil;
   said fake bait strip member is soaked in any suitable scent;
   a bait head member having a top aperture, a pair of coaxial side apertures, and a rear aperture;
   a shaft member passing through a first aperture of said pair of coaxial side apertures, said fake bait strip member, and a second aperture of said pair of coaxial side apertures to hold said fake bait strip member in said bait head member;
   a fishing hook;
   a fishing line;
   a first portion of said fishing line passes through said top aperture of said bait head member and then through said rear aperture of said bait head member and then to said fishing hook; and
   said fishing line also passes through said top aperture of said bait head member to a second portion of said fishing line which is provided with at least one teaser head fly and a bead chain swivel.

* * * * *